Aug. 16, 1927.
R. G. PATTERSON
1,639,055
BROOM CORN HARVESTER
Filed Oct. 10, 1924
3 Sheets-Sheet 2
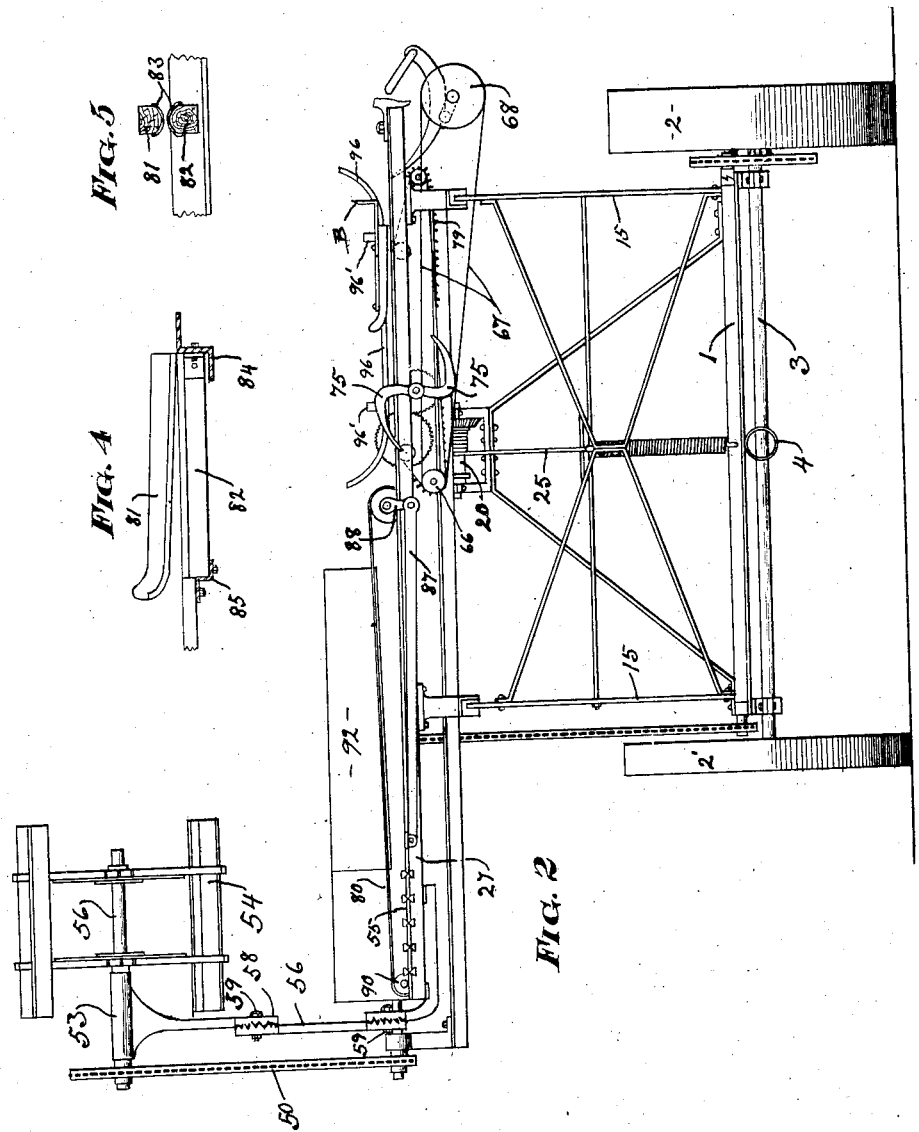
Inventor
Roy G. Patterson
U. G. Charles
Attorney

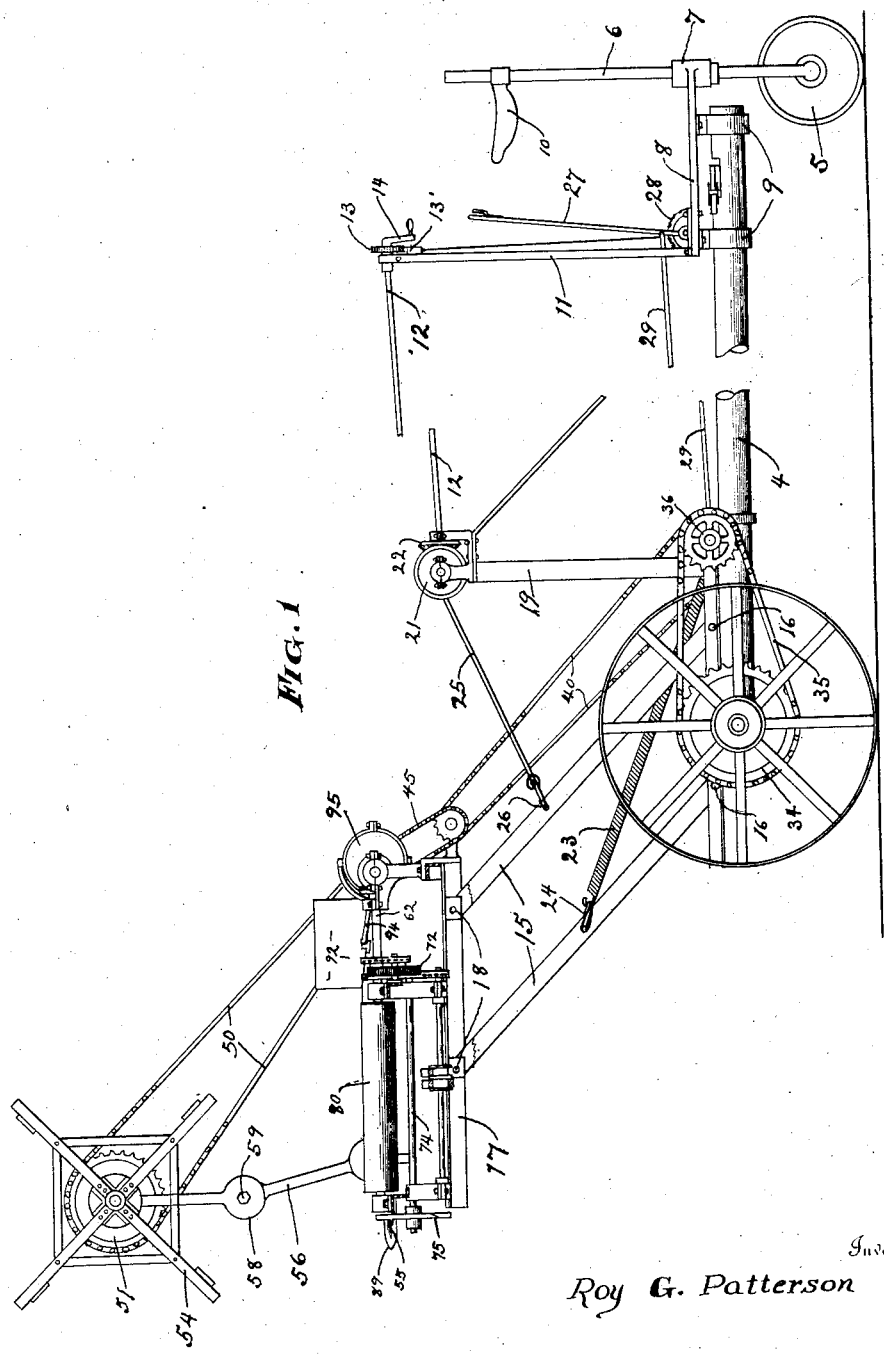

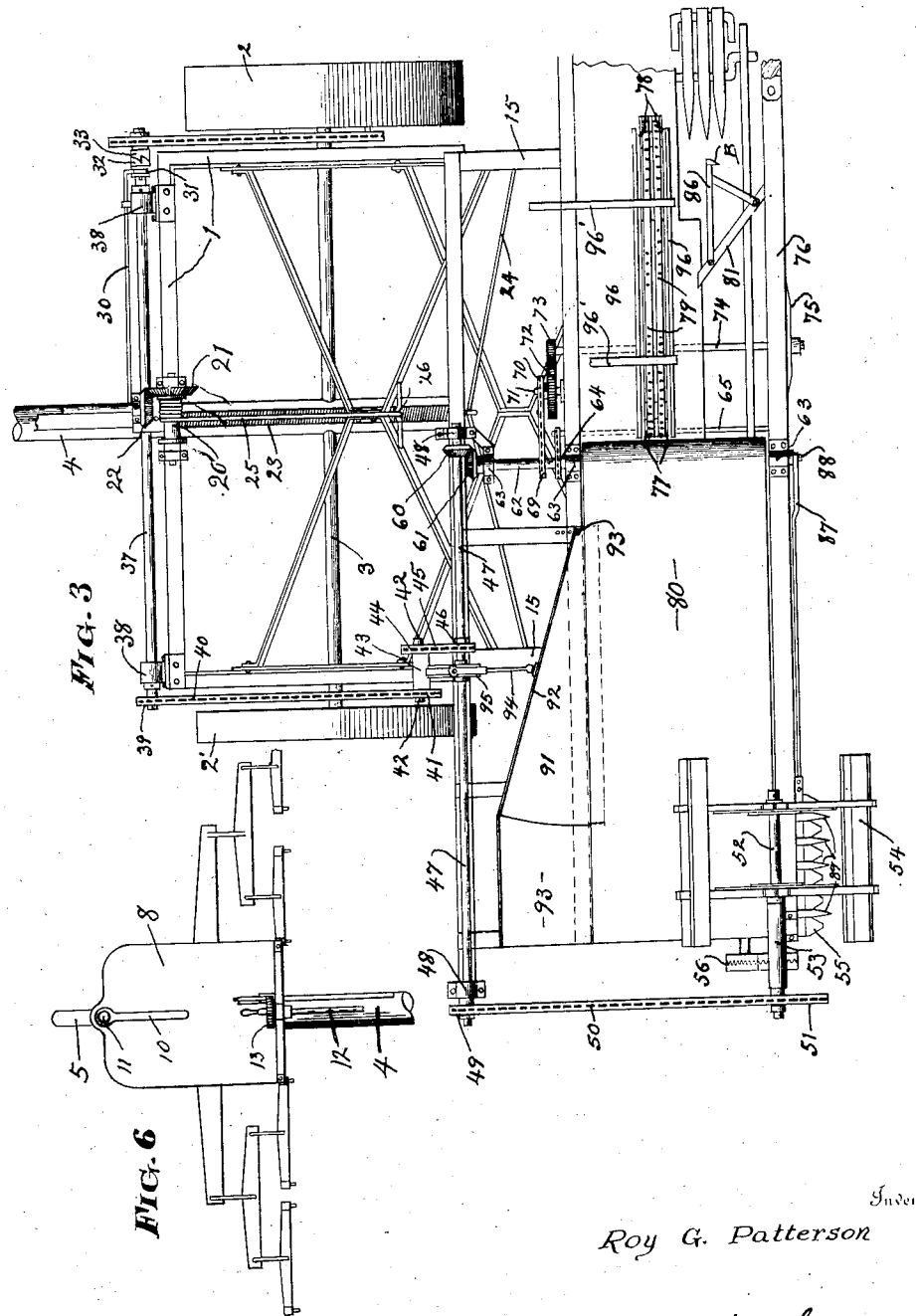

Patented Aug. 16, 1927.

1,639,055

UNITED STATES PATENT OFFICE.

ROY G. PATTERSON, OF HUGOTON, KANSAS, ASSIGNOR OF TWENTY-FIVE PER CENT TO M. R. STEWART, OF WILBURTON, KANSAS, AND TWENTY-FOUR PER CENT TO FLOYD BEATY, OF HUTCHINSON, KANSAS.

BROOMCORN HARVESTER.

Application filed October 10, 1924. Serial No. 742,817.

My invention relates to a broom corn harvester.

The object of my invention is to provide a machine whereby motive power for conveyance is operated at the rear of the machine.

A further object of the invention is to provide a machine that will cut the heads of broom corn from the stalk and then even the heads by an element striking the butt ends of the brush, and then shear the surplus stalk, leaving the heads and remaining stalk in uniform length.

A still further object of my invention is to provide a machine having a cutting and binding mechanism that is adjustable vertically.

A still further object of the invention is to provide a broom corn harvester that will cut the heads from the stalk and bind them in bundles.

These and other objects will be hereinafter more fully explained.

Referring to the drawings, Fig. 1 is a side elevation of the machine.

Fig. 2 is a rear elevation of the machine.

Fig. 3 is a top view of the machine.

Fig. 4 is an enlarged detail of the boot stripping device.

Fig. 5 is a sectional view through the bars of Fig. 4 taken on line A—A' looking in the direction of the arrow.

Fig. 6 is a top view of the foot plate and double trees, which are on the rear end of the beam.

My invention is a broom corn harvesting machine, having a frame 1, being in rectangular shape, and mounted on wheels 2 and 2', the said wheels being connected by an axle 3, which is rigidly attached to the said frame. A beam 4 is rigidly attached to said frames and axle and extending rearwardly, and to the end thereof is attached a guide wheel 5, said wheel having an upright 6 which is journaled in a bearing 7, and said bearing is connected to said beam by means of a foot plate 8, and on the under side of said plate are tie bands 9, which are rigidly attached to the end of said beam. 10 is a guide arm, by which means the guide wheel is manipulated in steering the machine as desired by the operator.

Mounted on the foot plate is a standard 11, and on the top end thereof is a shaft 12, journaled, said shaft having a ratchet 13, stationed by a pawl 13', and a crank 14, by which means the supporting parallel bars 15 are raised and lowered as follows:

It will be understood that the supporting bars are pivotally attached to the frame 1 as shown at 16, and the opposite end is pivotally attached to a frame 17, as shown at 18, the said frame 17 is adapted to support the cutting and binding mechanism, hereinafter described. A standard 19 is rigidly attached to the frame 1 and on the top end thereof is journalled a rope drum 20, the said drum having a bevelled gear 21, which is in mesh with a beveled gear 22, and the last said gear is rotated by a shaft 12, as heretofore described and by rotating said shaft the cutting and binding mechanism is raised and lowered and held in position by means of the said ratchet mechanism. To obviate the excess weight of the cutting and binding mechanism which is mounted on the parallel bars 19, I have provided as counterbalance means, the spring 23, same being connected to the beam at one end and the opposite end to a bail connecting a pair of the front parallel bars as at 24. The cable 25 is wound on the spool 20 and the opposite end is attached to a bail which connects the rear pair of parallel bars as at 26. The said cable and connecting mechanism function as means for raising and lowering the cutting and binding mechanism.

A lever 27 is adapted to throw the machine in and out of gear, the said lever having a pawl engaging in a toothed sector member 28 as means for holding the position required. The connecting rod 29 engages with the bell crank 29', positioned on the beam 4, and the said bell crank engaging with a connecting rod 30, the said rod having a yoke 31, engaging in an annular groove which is integral with a ratchet 32, the said ratchet engaging with a ratchet 33, the said members 32 and 33 function as a clutch, for engaging and disengaging the operations of the machine.

When the machine is being driven through the field, wheel 2 functions as the master wheel, having a sprocket wheel 34 mounted thereon, the said wheel having a sprocket chain 35, engaging on a sprocket wheel 36, the said wheel being mounted on a shaft 37, said shaft being revolvably mounted on the frame by bearings 38. On the opposite end of said shaft is a sprocket 39 and a chain 40 engaging on a sprocket 41, the said sprocket being on a shaft 42, which is revolvably mounted on a bearing 43, and on the opposite end of said shaft is a sprocket 44 and a chain 45 engaging on said sprocket and a sprocket 46, the said sprocket being rigidly attached to a shaft 47. The said shaft is revolvably mounted in bearings 48 and on the outer end carries the sprocket 49. A chain 50 is the medium for transmitting power from the sprocket 49 to the sprocket 51, said sprocket being mounted on a shaft 52 which is mounted in a bearing 53 and on said shaft is rigidly mounted, a reel 54, the said reel being means for supporting the broom corn heads while being cut by the cycle 55. 56 is a toggle jointed arm, being mounted on a bar 57, the said bar being the front member of the frame work, supporting the cutting and binding apparatus. The said arm 56, having toothed joints 58 and the said joints being clamped together by means of bolts 59, so that when the reel is raised or lowered to accommodate for the length of the broom corn heads, it can be so positioned that the chain 50 will have proper tension to engage with the sprocket wheels 49 and 51.

On the end of shaft 47 is a bevelled gear 60, in mesh with the gear 61 and the said gear being mounted on a shaft 62, which is mounted on bearings 63 and the said shaft having a sprocket 64 engaging in a sprocket mounted on a shaft 65 and on the opposite end of said shaft is a sprocket 66, engaging a chain 67 and the said chain engaging on the sprocket 68 which is the driving means for a standard packing and binding apparatus. The said binder, I do not claim broadly as any standard make of binder may be applied and will function for the duties required for binding the broom corn heads as they are cut and delivered. It will be understood that on shaft 62 is mounted a drum as belt conveying means, as hereinafter described. The said belt adapted to deliver the broom corn heads to the conveyor chains and the butt shearing mechanism, the said chains conveying the heads to the packing and binding mechanism heretofore described.

A sprocket 69 is mounted on a shaft 62, having a chain engaging on a sprocket 70 and the said sprocket being attached to a shaft 71, having a gear 72 mounted thereon, and the said gear engaging with a gear 73 and on the opposite end of said shaft are rigidly attached, cutting blades 75, said blades shearing closely to the edge of a channel bar 76, by which means the stalk of the broom corn heads are sheared evenly, while passing on to be bound into bundles.

On shaft 65 are mounted two sprockets, 77, and at 78 are two sprockets, being in alignment with first said sprockets so that two conveyor chains 79 are engaged thereon, the said chain having fingers extending so that when the corn heads delivered from the belt 80 will be conveyed to the binding apparatus and to remove the boot that may remain on the stalk of the corn heads, I have provided two bars 81 and 82, the adjacent faces of which are covered with rubber 83, and adapted to pull the boot from the stalk as it passes on. The said bar 82, being substantially supported on a Z bar 84, and a Z hanger 85 and the bar 83 being supported by an arm 86, the end of which is broken away at B, for convenience of illustration, of the other parts of the machine. A pitman rod 87, being actuated by a crank 88 which is rigidly attached to the shaft 62, the said pitman being connected to the sickle 55 as at C, and the said sickle reciprocating in guard fingers 89 by which means the corn heads are cut from the stalk, and the belt 80 being driven by a drum mounted on shaft 62 and a drum 90.

The heads will vary in length as they are cut from the stalk, by reason of different heights, therefore I have provided an oscillating mechanism 91, having a vertical wall 92, the said member joining to an extension 93 as supporting means for the ends of the heads, the said member 91 being pivotally attached to a cross bar at 93′ and in said bar are a plurality of holes D for varying the position of the said member at the point where the broom corn heads are being conveyed on for shearing to a uniform length, and binding. A connecting rod 94 engages with an eccentric 95, which is actuated by shaft 47, by which means the member 91 is rapidly oscillated, bringing the broom corn heads, to an even alignment at the brush end, so that when the shearing of the stalk takes place, by the knife 75, the heads will be uniform in length. When the heads are being conveyed, they pass from the belt 80 dropping to the conveyor chains 79 and directly over said chains are positioned two pressure arms 96, having the ends curved upward as shown in Fig. 2 and the said arms are held in position by cross bars 96′, one of which has the end broken away, for convenience of illustrating the work beneath.

Such modifications may be made, as lie within the scope of the appended claim, and having thus described my invention, what I claim as new and desire to secure by Letters Patent is:

In a broom corn harvester, a machine of the kind described, having parallel bars pivotally connected to the carrying means, a cable attached to said bars, a drum and a crank as actuating means to raise and lower said bars, a counter-balance spring attached to said bars in such a way that the tension thereof is inclined to position said bars vertically counter-balancing the load imposed on the outer ends thereof, a frame on the outer ends of said bars, a reel supported by a jointed arm, said arm attached to said frame, the joint in said arm functions as raising and lowering means for said reel, a sickle in operative position to said reel, a belt conveyor adjacent to said sickle, an oscillating mechanism near the rear side of said belt, said oscillator adapted to even the head ends of the broom corn, conveyor chains extending longitudinal with said belt and working relation therewith, a shearing mechanism spaced from said conveyor functioning as means for shearing the butt ends of the broom corn heads to a uniform length, a binding mechanism in operative position to the outer end of said conveyor to bind the broom corn heads in bundles.

ROY G. PATTERSON.